(12) United States Patent
Cook (10) Patent No.: US 8,654,707 B2
(45) Date of Patent: Feb. 18, 2014

(54) METHOD AND SYSTEM OF IMPLEMENTING A RADIO NETWORK IN UNLICENSED SPECTRUM

(75) Inventor: Charles I. Cook, Louisville, CO (US)

(73) Assignee: Qwest Communications International Inc., Denver, CO (US)

(*) Notice: Subject to any disclaimer, the term of this patent is extended or adjusted under 35 U.S.C. 154(b) by 339 days.

(21) Appl. No.: 12/796,612

(22) Filed: Jun. 8, 2010

(65) Prior Publication Data

US 2011/0299511 A1 Dec. 8, 2011

(51) Int. Cl.
*H04W 4/00* (2009.01)
*H01Q 11/12* (2006.01)
*H04B 1/04* (2006.01)

(52) U.S. Cl.
USPC ........... 370/328; 370/331; 370/334; 370/482; 370/493; 370/494; 370/495; 455/444; 455/553.1; 455/127.4; 455/168.1

(58) Field of Classification Search
USPC ......... 370/277, 310, 328, 331, 334, 478–482, 370/493–495; 455/436, 435.2, 444, 455/550.1–553.1, 127.4, 168.1, 455/179.1–180.1
See application file for complete search history.

(56) References Cited

U.S. PATENT DOCUMENTS

| | | | |
|---|---|---|---|
| 8,229,440 B2* | 7/2012 | Yoon et al. | 455/444 |
| 2004/0203815 A1* | 10/2004 | Shoemake et al. | 455/450 |
| 2007/0015536 A1* | 1/2007 | LaBauve et al. | 455/552.1 |
| 2009/0196253 A1* | 8/2009 | Semper | 370/331 |
| 2009/0196268 A1* | 8/2009 | Caldwell et al. | 370/338 |
| 2010/0278141 A1* | 11/2010 | Choi-Grogan et al. | 370/331 |
| 2011/0003575 A1* | 1/2011 | Snapp | 455/404.1 |
| 2011/0117889 A1* | 5/2011 | Burgess et al. | 455/413 |
| 2011/0299511 A1* | 12/2011 | Cook | 370/338 |

* cited by examiner

*Primary Examiner* — Michael Thier
*Assistant Examiner* — Benjamin H Elliott, IV
(74) *Attorney, Agent, or Firm* — Swanson & Bratschun, L.L.C.

(57) ABSTRACT

Methods, systems, and devices are disclosed for wireless communication over unlicensed spectrum using a femto cell. In an implementation of the system, a dualmode mobile device adapted to communicate over a licensed frequency spectrum and over an unlicensed frequency spectrum is provided. The dual-mode mobile device detects the presence of a femto cell communicating over an unlicensed spectrum and in response, initiates a communication connection with the unlicensed spectrum femto cell. Subsequently, the connection over a license spectrum may be disconnected upon successful establishment of the connection over the unlicensed spectrum. In yet another implementation, a femto cell communicating over an unlicensed spectrum may be adapted to communicate with a mobile switching center and/or with a voice over IP switch.

17 Claims, 9 Drawing Sheets

METHOD AND SYSTEM OF IMPLEMENTING A RADIO NETWORK IN UNLICENSED SPECTRUM

TECHNICAL FIELD

Embodiments of the invention are generally related to radio communication network, and in particular to a method for transmitting broadcast services to a mobile terminal through the use of a femto base station using alternate frequency spectrums.

BACKGROUND

As information-based industries constitute an ever growing part of national economies in many developed as well as developing countries, telecommunication networks have become an essential part of national infrastructure. Especially in developed economies, industries as well as societies are highly dependent on faster and easier access to information, entertainment, and education via the telecommunications networks.

In recent years, use of mobile communications devices for voice telephone services, email or text messaging services and even multi-media service has become commonplace, among mobile professionals and throughout the more general consumer population. Mobile service provided through public cellular or PCS (personal communication service) type networks, particularly for voice telephone service, has become virtually ubiquitous across much of the world. In addition to public networks, similar wireless technologies have provided relatively small scale networks for enterprise applications, typically offering wireless service analogous to private branch exchange (PBX) type service. Such a smaller scale private system includes several base stations, similar to but scaled down from those used in the public networks, in combination with a private circuit switch or more recently an Internet Protocol (IP) router or network, for providing communications between devices and with external networks. Although sometimes referred to as an "indoor cellular network" or "indoor system," such enterprise systems need not be literally indoors and for example may offer coverage across an entire campus area. Alternatively, such an enterprise cellular communication system may be referred to as a "pico-cell" system, with the outdoor public cellular communication system covering a wider area being referred to as a "macro-cell" system.

As broadband IP connectivity to homes and offices has become more common, and the speeds of packet-switched communications equipment and the speed of processors have increased, a variety of applications have emerged that utilize IP packet transport as an alternative bearer for voice communications. As an extension of these developments/deployments into the customer premises, particularly for residential or small business applications, equipment manufacturers have recently begun offering "femto" cell devices, e.g., for home installation. A "femto" cell system is a base transceiver system (BTS) forming a compact base station. In most recent examples, such compact base stations are equipped with VoIP capability and an IP interface, for example, connecting through a digital subscriber line (DSL) modem or to a cable modem to a wireless carrier network. One such unit in a home or small business, for example, would allow mobile station users in the premises to make and receive calls via the existing broadband wireline service from the customer's Internet Service Provider (ISP), without consuming air-time minutes for wireless service that otherwise would connect directly to a wireless carrier network.

Typical femto nodes are deployed in the owned licensed spectrum of a telecommunication service provider's (carrier). This allows the carrier to manage any radio frequency (RF) interference with other communication channels. In such an installation of the femto nodes, communication from the femto node is tied to such carrier's mobile network, meaning that all calls and connections originating from and destined to the femto cell are tied to such carrier's mobile switching center (MSC).

Figure 1:
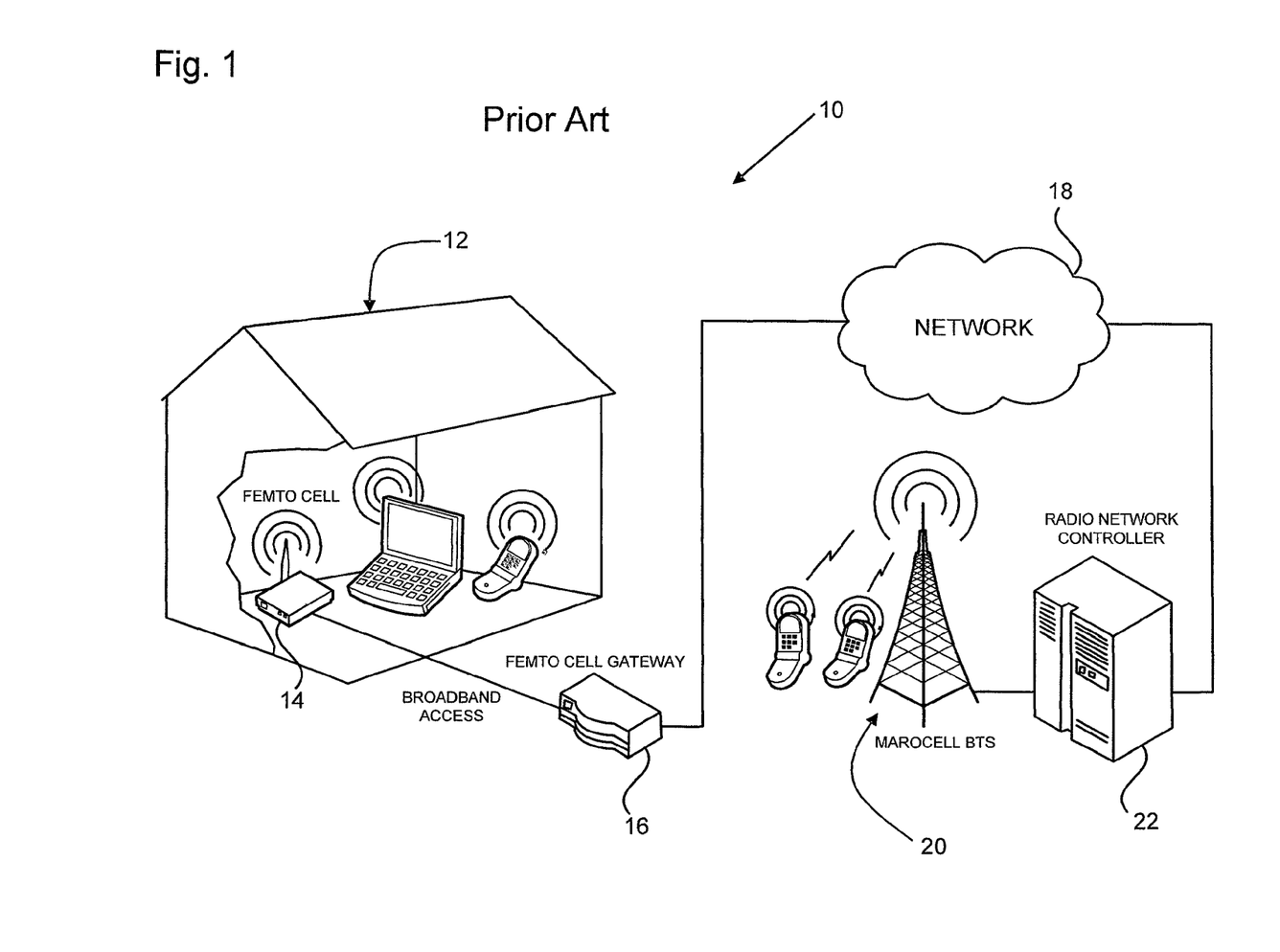
FIG. 1 illustrates the prior art environment in which femto cells are used.

FIG. 1 illustrates a simplified diagram of the environment of a typical femto/macro cell (referred to hereinafter as femto cell) 10 architecture. Typical femto cells are low-power wireless access points that operate in licensed spectrum to connect standard mobile devices to a mobile operator's network using residential DSL or cable broadband connections. The femto cell 10 may be implemented in a home 12 using an integrated cellular base station and DSL modem, seen in FIG. 1 as a single-unit access point 14. In alternate embodiments, the access point 14 may include a cable modem, an optical modem, etc. The access point 14 may be connected to a femto cell gateway 16, which connects the access point 14 to an external communications network 18. The femto cell 10 illustrated herein may be operated by a mobile service provider that operates a macrocell base transceiver system (BTS) 20 via a radio network controller 22.

Figure 2:
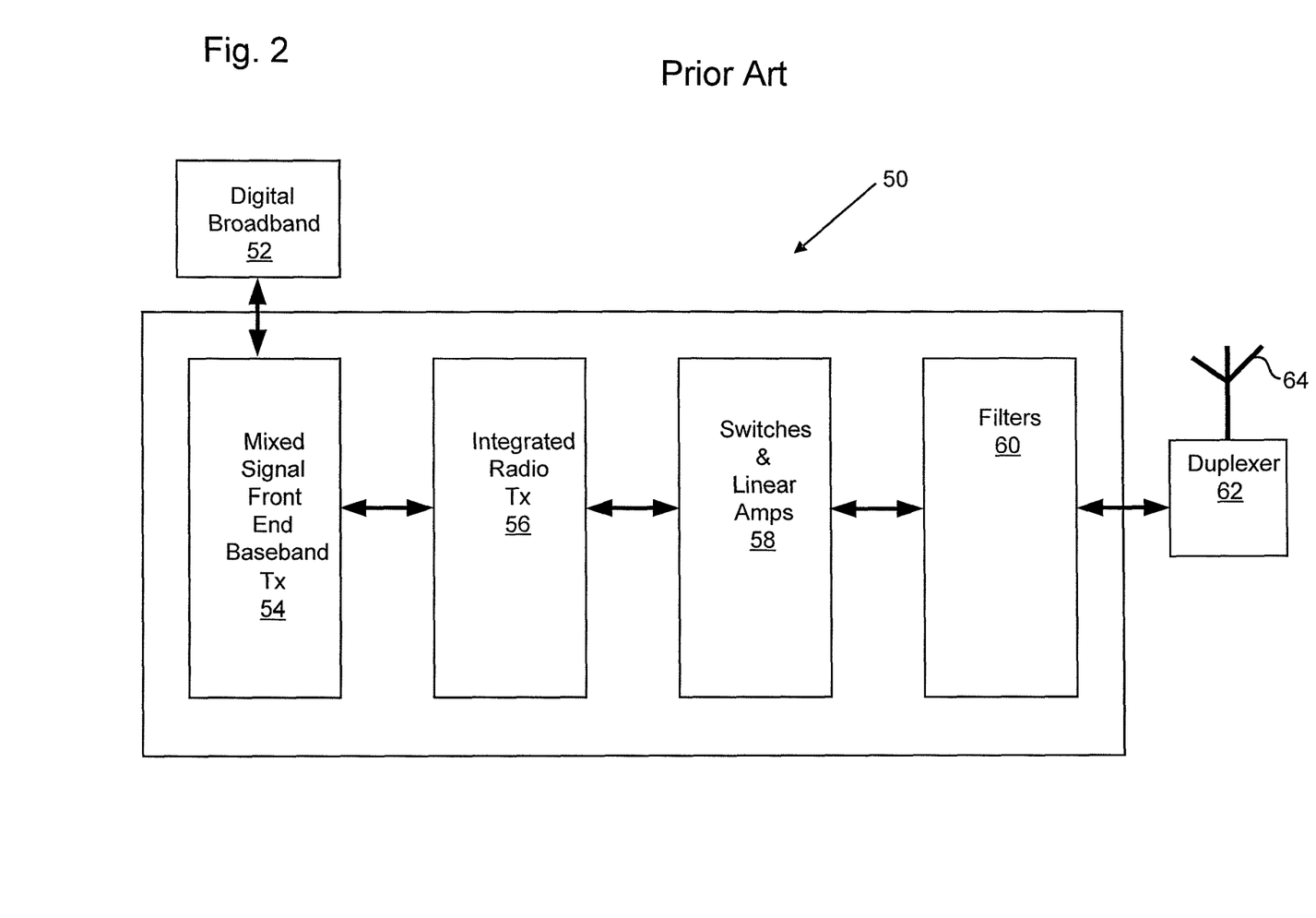
FIG. 2 illustrates in greater detail a prior art implementation of a femto node or femto access point.

FIG. 2 illustrates a prior art implementation of a femto cell access point 50 (also referred to in the art as femto cell node), which may provide the function of the femto cell access point 14 seen in FIG. 1. The femto cell access point 50 converts a digital data stream into an RF signal, and vice versa. The femto cell access point 50 may be connected to a digital broadband link 52 such as a DSL line, a cable, etc., via a DSL or other broadband modem (not shown). A mixed signal front-end baseband transceiver 54 may be used to convert the broadband digital signal into analog baseband signal and vice versa. The baseband transmitter 54 is bi-directionally interconnected to an integrated radio transceiver 56 containing programmable frequency synthesizers for generation of transmit and receive local oscillator signals, and other necessary components such as loop filters, etc. The integrated radio transceiver 56 communicates via filters 60 and linear amplifiers 58 to a duplexer 62 connected to an RF antenna 64. The RF antenna 64 receives and transmits signals in order to communicate with mobile devices.

Because the femto cell 10 operates in the licensed spectrum of the mobile service provider, such mobile service provider monitors the usage of the femto cell 10. Additionally, the mobile service provider may set-up the femto cell in a manner so that the traffic generated by the femto cell 10 is billed by the mobile service provider in some manner, which may be different than billed traffic passing directly between mobile users and traditional cell cites. However, such deployment of femto cells in mobile service providers' licensed spectrum restricts the use of the femto cells to the mobile service provider. Moreover, generally, the mobile service provider may restrict the use of the femto cells to only those mobile devices that are capable of communicating over the licensed spectrum of such mobile service provider. Therefore, there is a need for an alternate architecture of femto cells that makes the use of such femto cells more flexible and universal.

BRIEF SUMMARY

The following presents a simplified summary of the invention in order to provide a basic understanding of some aspects of the invention. This summary is not an extensive overview of the invention. It is not intended to identify all key or critical elements of the invention or to necessarily delineate the scope of the invention. Its sole purpose is to present some concepts of the invention in a simplified form as a prelude to the more detailed description that is presented later. Among other things, embodiments of the invention include methods, systems, and devices for providing telecommunication services.

Methods, systems, and devices are disclosed for wireless communication over unlicensed spectrum using a femto cell. In an implementation of the system, a dual-mode mobile device adapted to communicate over a licensed frequency spectrum and over an unlicensed frequency spectrum is provided. The dual-mode mobile device may be able to detect the presence of a femto cell communicating over an unlicensed spectrum and in response, it may initiate a communication connection with the femto cell using the unlicensed spectrum. Subsequently, a connection over a license spectrum may be disconnected upon successful establishment of the connection over the unlicensed spectrum. In yet another implementation, a femto cell communicating over an unlicensed spectrum may be adapted to communicate with a mobile switching center and/or with a voice over IP switch.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

A further understanding of the nature and advantages of the present invention may be realized by reference to the figures, which are described in the remaining portion of the specification. In the figures, like reference numerals are used throughout several figures to refer to similar components.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the invention, as other embodiments of the invention may omit such features. Further, while various embodiments are described with reference to the Internet, embodiments of the invention may be implemented in any network.

Unless the context clearly indicates otherwise, as used herein, the term "connect," means to place into communication (e.g., optical communication, electrical communication, etc.) the two elements being connected, for example, so that signals (optical, electrical) may be passed unidirectionally and/or bidirectionally from one element to the other. This functionality may include, but need not necessarily include, physically coupling the two elements, securing such a physical coupling, and/or the like. Similarly, two elements that are said to be "connected" are in communication with one another to allow signals to pass from one element to the other, and a "connection" between two elements means that the two elements are in communication with one another. Also, the word "exemplary" is used herein to mean "serving as an example, instance, or illustration." Any embodiment described herein as "exemplary" is not necessarily to be construed as preferred or advantageous over other embodiments.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). The term cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). For further reference, cdma2000 technology is described in documents from an organization named "3rd Generation Partnership Project 2" (3GPP2). These various radio technologies and standards are known in the art.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As an access terminal ("AT") moves through such a network, the access terminal may be served in certain locations by access nodes ("ANs") that provide macro coverage while the access terminal may be served at other locations by access nodes that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors. In various applications, other terminology may be used to reference a macro node, a femto node, or a pico node. For example, a macro node may be configured or referred to as an access node, base station, access point, eNodeB, macro cell, and so on. Also, a femto node may be configured or referred to as a Home NodeB, Home eNodeB, access point base station, femto cell, and so on.

Embodiments of the invention may find application for each of these many various node types One exemplary embodiment discussed herein provides improved system and methods for mobile stations to access femto cells. Specifically referring to FIG. 3, one embodiment of a femto cell access point or node 100 is provided. The femto cell node 100 may be communicatively connected to a broadband node 102 such as a DSL modem, a cable modem, etc., to communicate with a telecommunication service provider. In some cases, the broadband node 102 may be integrated into a single unit with femto node 100. Even though in the configuration illustrated in FIG. 3 the femto cell node 100 is connected to a broadband node 102, in an alternate embodiment, the femto cell node 100 may be communicatively connected to another type of communication line that has the communicative capacity of less than typical broadband communication line. The femto cell node 100 communicates with the broadband node 102 via an Ethernet interface 104. Depending on the type of broadband access, alternate type of interfaces may also be used. The Ethernet interface 104 acts as a transceiver that may convert the digital signal from the broadband node 102 to analog signal for processing by a core processing module 106. The Ethernet interface 104 may also process an analog signal received from the core processing module 106 into a digital signal that may be transmitted by the broadband node 102. The core processing module 106 may include various components necessary for modulating and mixing signals received from the Ethernet interface 104 and for demodulating and mixing the signals received from a receiver 108. The core processing module 106 may communicate modulated signals to a transmitter 110 so that it may transmit such signals via an antenna 112.

Figure 3:
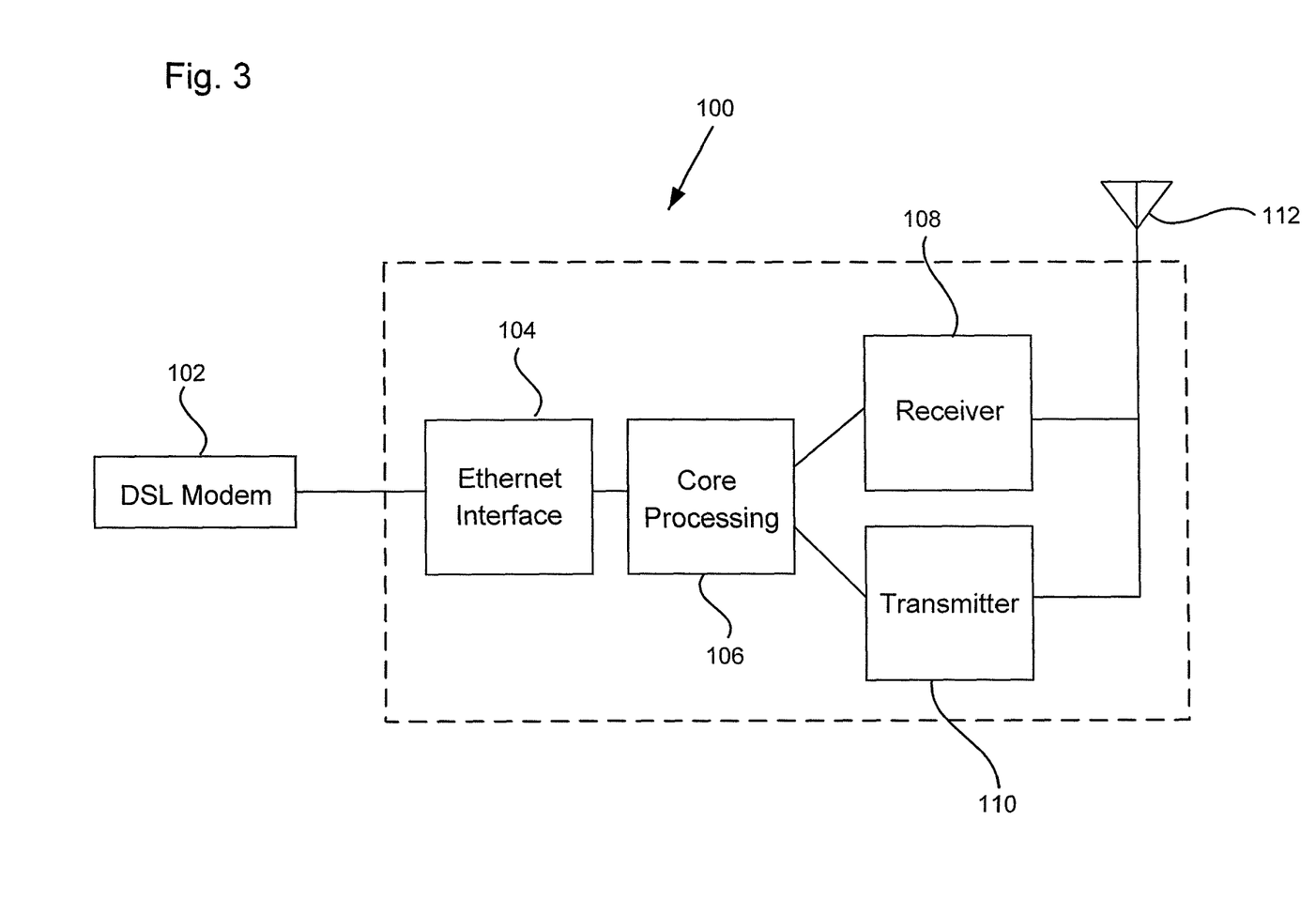
FIG. 3 illustrates an implementation of a femto node or femto access point in accordance with one embodiment of the invention.

In an embodiment of the femto cell node 100, the core processing module 106 may be a core processing module programmed in a manner such that the frequency band that will be used to modulate signals transmitted by the antenna 112 can be selected automatically or manually by the user. For example, the core processing module 106 may be designed in a manner so that it may be able to generate signals to be transmitted over a licensed frequency band of a mobile service provider or over an unlicensed band, or both. Such unlicensed frequency band may include a television white space frequency band; an industrial, scientific and medical (ISM) radio band; and a 3.65 GHz band. Similarly, the receiver 108 and the transmitter 110 may also be designed in a manner so that they may process signals over various frequency bands. The antenna 112 may include a bank of antennas, with each of the antennas designed to receive and transmit RF signals over different frequency bands.

Various components of the femto cell module 100 may be designed in a manner to use frequency division duplex (FDD) or time division duplex (TDD) communication techniques for RF transmission. Moreover, an embodiment of the femto cell module 100 may be designed so that it may be able to determine the communication technique used by mobile devices communicating with the antenna 112 and accordingly implement either FDD or TDD based signal processing. Moreover, in yet another embodiment, the femto cell module 100 may be designed so that it may implement FDD for signals received in one frequency band and use TDD for signals received over another frequency band. For example, most licensed-band radios in the US use FDD, so it may be easier to implement the femto cell module 100 to communicate with mobile devices that use FDD in both licensed and unlicensed frequency bands. However, it could be mixed, so that the FDD is used over licensed frequency bands while TDD is used over unlicensed frequency bands and vice versa. Applications in other countries may use other implementations. For example, for a femto cell module 100 to be used in China, given the local communication regime, it may be advantageous to deploy TDD in the licensed spectrum. Therefore, in this case, the femto cell module 100 may be designed to communicate with mobile devices using TDD in both licensed and unlicensed frequency bands.

Figure 4:
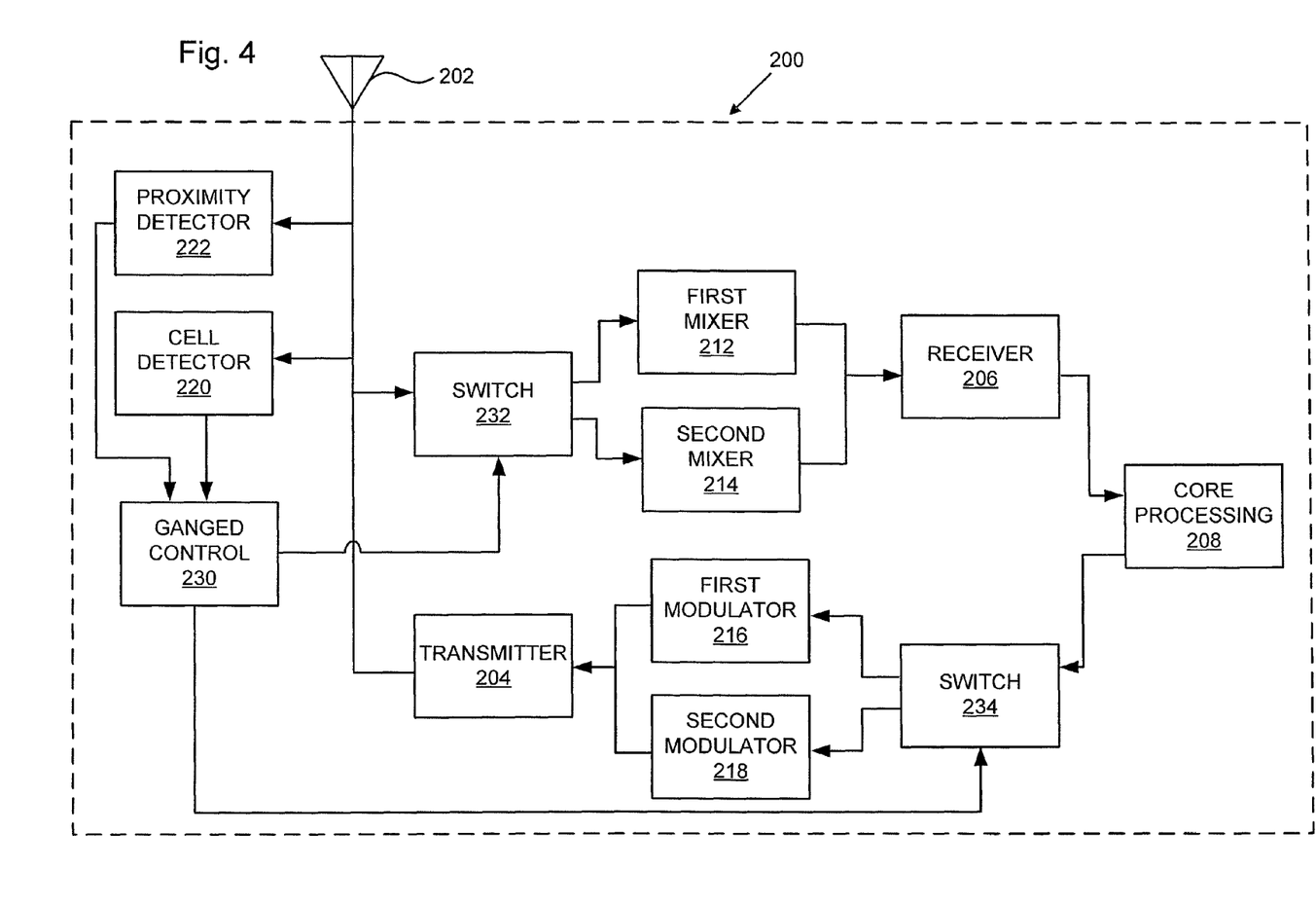
FIG. 4 illustrates a dual-mode mobile device that communicates with the access point of FIG. 3.

FIG. 4 illustrates an implementation of a mobile device 200 for use with the femtocell implementations disclosed herein. The mobile device may be a cell-phone, a personal data assistant (PDA), a laptop computer, etc. The mobile device 200 is a dual-mode device that is able to communicate over two different frequency bands. In an embodiment, the mobile device 200 may be implemented so that it may communicate both over an unlicensed spectrum and over a licensed spectrum of a mobile service provider. Even though the mobile device 200 is implemented to communicate over only two different frequency bands, in an alternate embodiment, the mobile device 200 may communicate over more than two different frequency bands.

The mobile device 200 uses an antenna 202 to receive RF signals and to transmit RF signals. The antenna 202 may receive and transmit RF signals by communicating with, for example, the femto cell module 100 disclosed in FIG. 4. Alternatively, the antenna 202 may also receive and transmit RF signals from and to a base station of a mobile service provider. The illustrated mobile device 200 also has a transmitter module 204, a receiver module 206, and a core processing module 208.

While not shown in FIG. 4, the core processing module 208 is connected to well-known voice/data sources to receive or provide voice and data messages that are processed by the core processing module 208, either to be received from or sent by an end user.

Additionally, the mobile device 200 may also have a number of mixers that allow the conversion of received RF signals to an intermediate frequency to allow improved selectivity (filtering) and an easier implementation of low noise and high gain amplification. In the implementation of FIG. 4, the mobile device 200 is designed with two mixers 212 and 214. The first mixer 212 is a mixer for signals received over an unlicensed frequency band, whereas the second mixer 214 is a mixer for signals received over a licensed frequency band. Note that in an alternate embodiment, more than two mixers may also be provided. The mixers provide intermediate frequency signals to the receiver module 206, which in turn provides them as a baseband signal to the core processing module 208.

In the implementation of FIG. 4, the mobile device 200 is designed with two modulators 216 and 218. Each RF modulator takes a baseband input signal (from core processing module 208) and outputs a radio frequency-modulated signal that can then be transmitted by transmitter 204 at the RF antenna 202. The first modulator 216 is a modulator for signals to be transmitted over an unlicensed frequency band, whereas the second modulator 218 is a modulator for signals to be transmitted over a licensed frequency band. Note that in an alternate embodiment, more than two modulators may also be provided.

In an implementation of the mobile device 200, the mobile device 200 may be provided with a femto cell signal detector 220 that is adapted to detect the presence of a signal from a femto cell. Specifically, such femto cell signal detector may detect RF signals over an unlicensed frequency band when such signals have been generated from a femto cell. The femto cell signal detector 220 may be designed to periodically scan for the presence of signals over a number of different frequency bands. For example, in one environment, the femto cell signal detector 220 may be designed to scan for the presence of signals over frequency bands of TV's white space, the ISM band, the 3.65 GHz band, etc.

In one embodiment, the mobile device 200 may also be provided (additionally or alternatively) with a proximity detector 222 that detects the proximity of a femto cell by using information about the location of the mobile device 200. Thus, for example, the proximity detector 222 may have a global positioning system (GPS) detector that constantly monitors the location of the mobile device 200 and a look-up table that is constantly updated by the location of various femto cells. The proximity detector 222 may use information about the location of the mobile device 200 and the look-up table to determine when it is close to a femto cell. Additionally, such lookup table may be provided with information about the frequency band used by each of the femto cells listed in the table, the power levels of such femto cells, etc. In an alternate embodiment, the proximity detector 222 may compare the strength of a signal over an unlicensed spectrum to a threshold level to determine the proximity of a femto cell transmitting over an unlicensed spectrum.

The information about the presence of a femto cell signal and/or the information about the proximity of a femto cell may be used to manage a ganged control module 230. Such ganged control module 230 may be used to select the path of the signal received by the mobile device 200 and/or to select the path of a signal being transmitted by the mobile device 200.

For example, when it is determined that the mobile device 200 is in proximity of a femto cell that is transmitting over an unlicensed frequency band, the ganged control module 230 may direct the received RF signal from the antenna 202 through a switch 232 to the first mixer 212 for conversion of received RF signals over the unlicensed frequency band to an intermediate frequency that may be processed by the receiver 206. In this case, the ganged control module 230 also directs an outgoing baseband signal generated by the core processing module 208 through a switch 234 to the first modulator 216, which is designed to take the baseband input signal and outputs a RF-modulated signal over the same unlicensed frequency band. Such modulated RF output signal is processed by the transmitter 204 and subsequently transmitted via the antenna 202. Thus, with the proximity of a femto cell communicating over the unlicensed frequency band, in this case the mobile device 200 is able to communicate with the femto cell in a duplex mode using the unlicensed frequency band.

On the other hand, if it is determined that there is no femto cell in the proximity of the mobile device 200 and that the received signal is over a licensed frequency band, the ganged control module 230 may direct the RF signal from the antenna 202 through switch 232 to the second mixer 214 that is designed for conversion of received RF signals over the licensed frequency band to an intermediate frequency that may be processed by the receiver 206. In this case, the ganged control module 230 also directs a baseband signal from the core processing module 208 through switch 234 to the second modulator 218, which is designed to take the baseband input signal and outputs a RF-modulated signal over the licensed frequency band. Such modulated RF output signal is processed by the transmitter 204 and subsequently transmitted via the antenna 202. Thus, when there is no femto cell communicating over the unlicensed frequency band near the mobile device, the mobile device communicates with a femto cell of the mobile service provider using the licensed frequency band or with a macro cell of the mobile service provider.

The ganged control module 230 may include logic implemented in hardware for performing the control functions described, or may be implemented using software and a processor, either as a stand alone component as illustrated in FIG. 4 or integrated with the processing function of the core processing module 208.

Figure 5:
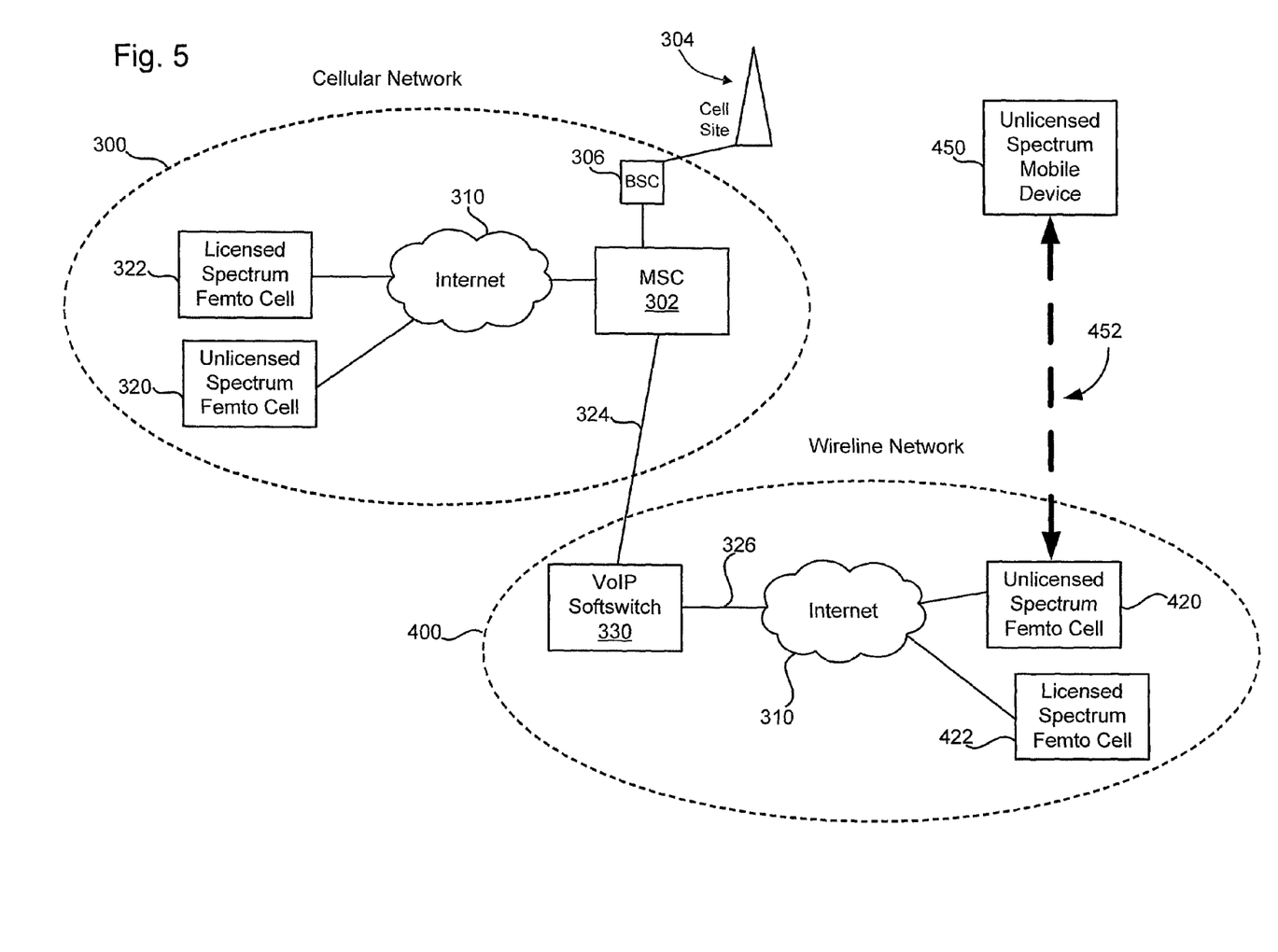
FIG. 5-8 illustrates various implementations of telecommunication networks using the systems disclosed herein.

FIGS. 5 through 8 illustrate various methods of using the femto cells and the mobile devices discussed herein. Specifically, these figures illustrate various implementations of femto cells communicating using unlicensed frequency bands and/or licensed frequency bands with mobile devices using unlicensed frequency bands and/or licensed frequency bands. Specifically, FIG. 5 illustrates an implementation of a cellular network 300 and a wireline network 400 interacting with each other. In the implementation illustrated in FIG. 5, the cellular network 300 includes a mobile switching center (MSC) 302 communicating with a cell site 304 via a base station controller (BSC) 306. The cell site 304, also known as a base transceiver station (BTS), is a piece of equipment that facilitates wireless communication between user equipment (UE) such as the mobile devices and a network. The mobile switching center 302 may be a primary service delivery node for the cellular network 300, responsible for handling voice calls, SMS, as well as other services. The MSC 302 may be interconnected with the Internet 310 via broadband connection, such as a fiber cable, etc. The cellular network 300 is also illustrated as having an unlicensed spectrum femto cell 320 and a licensed spectrum femto cell 322.

Both femto cells 320 and 322 may communicate with the Internet via a wire-line communication method, such as a broadband cable, etc. As discussed above with respect to FIGS. 1 through 4, the unlicensed spectrum femto cell 320 and the licensed spectrum femto cell 322 may communicate with mobile devices depending upon the type of communication capabilities of the mobile devices. For example, the unlicensed spectrum femto cell 320 may be able to communicate either with a mobile device communicating over an un-licensed frequency band or with a dual-mode mobile device such as the mobile device 200 (FIG. 4), using an unlicensed frequency band. On the other hand, the licensed spectrum femto cell 322 may be able to communicate with either a mobile device communicating over a licensed frequency band or with a dual-mode mobile device such as the mobile device 200, using a licensed frequency band.

The cellular network 300 may be interconnected with the wireline network 400 directly through a broadband cable 324, such as a fiber cable, a wireless communications link, etc. In the implementation illustrated in FIG. 5, the cellular network 300 may also communicate with the wireline network 400 indirectly via the Internet 310. The wireline network 400 is illustrated to also have a voice over IP (VoIP) softswitch 330. The softswitch 330 may be able to support converged communications services by integrating SS7 telephone signaling with packet networks. Using network processors at its core, the softswitch 330 may support IP, DSL, ATM, frame relay as well as various other communication protocols. The soft switch 330 may be connected to the internet by a broadband cable 326. The wireline network 400 may also have an unlicensed spectrum femto cell 420 and a licensed spectrum femto cell 422. The femto cells 420 and 422 may work in a manner similar to the femto cells 320 and 322 as discussed above.

The implementation of the wireline network in FIG. 5 is illustrated to have an unlicensed spectrum mobile device 450 that is adapted to communicate wirelessly using an unlicensed frequency band. Such unlicensed spectrum mobile device 450 may be able to communicate with the unlicensed spectrum femto cell 420 in a manner discussed above with respect to FIGS. 1 through 4. The communication between the unlicensed spectrum mobile device 450 and the unlicensed spectrum femto cell 420 is illustrated by a wireless communication link 452, which may be over one of the unlicensed frequency bands such as the television white space frequency band; the industrial, scientific and medical (ISM) radio band; the 3.65 GHz band, etc.

Figure 6:
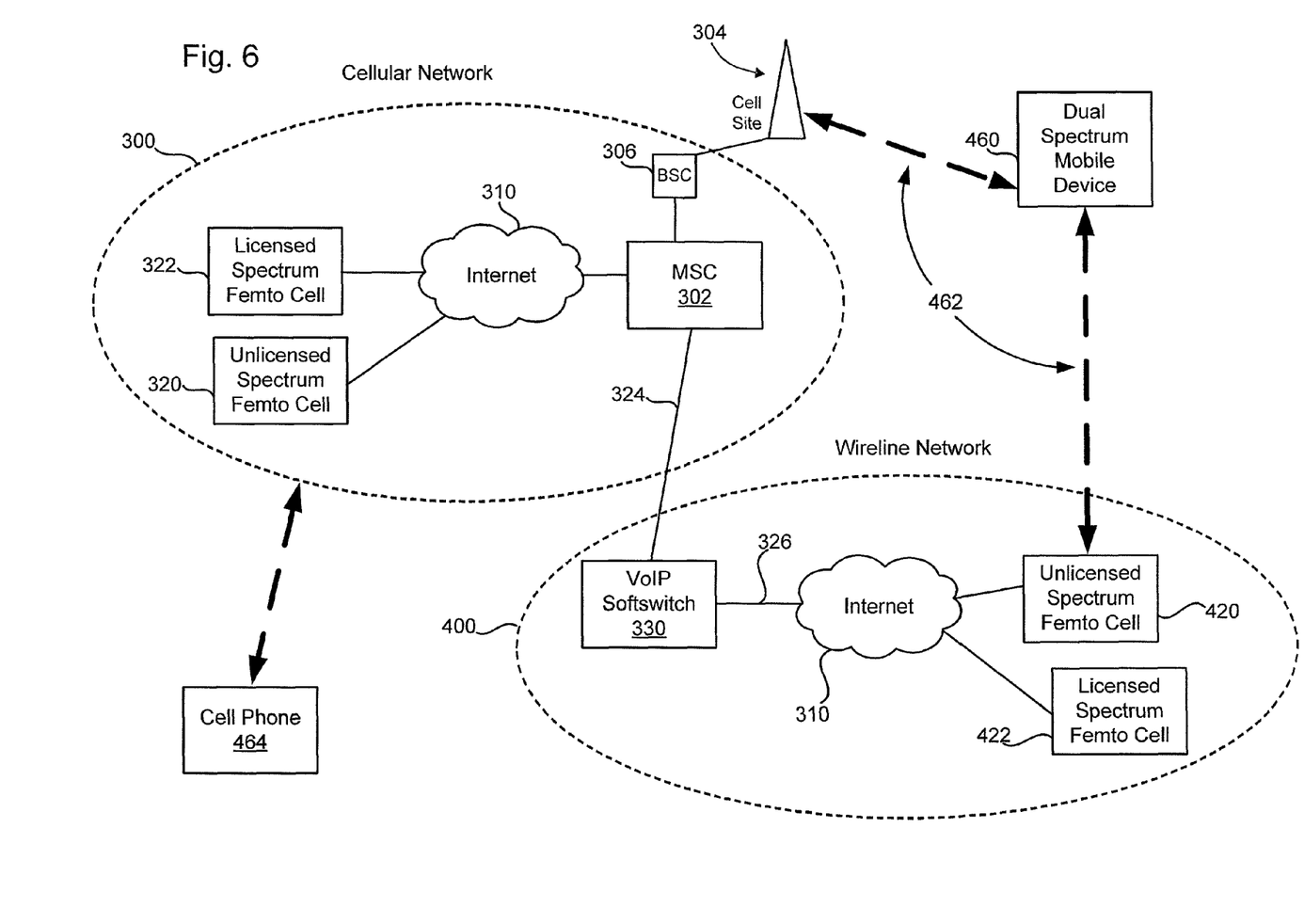

FIG. 6 illustrates an alternate implementation of the cellular network 300 and the wireline network 400 interacting with each other. Many of the components illustrated in FIG. 6 provide functionalities similar to the functionality of components in FIG. 5 having similar names and reference numbers. Therefore, description is provided herein only for those components that are different or if they provide a different functionality. In the implementation disclosed in FIG. 6, a dual spectrum mobile device 460 is illustrated as communicating with either the unlicensed spectrum femto cell 420 or the cell site 304, as illustrated by the communication link 462.

Figure 7:
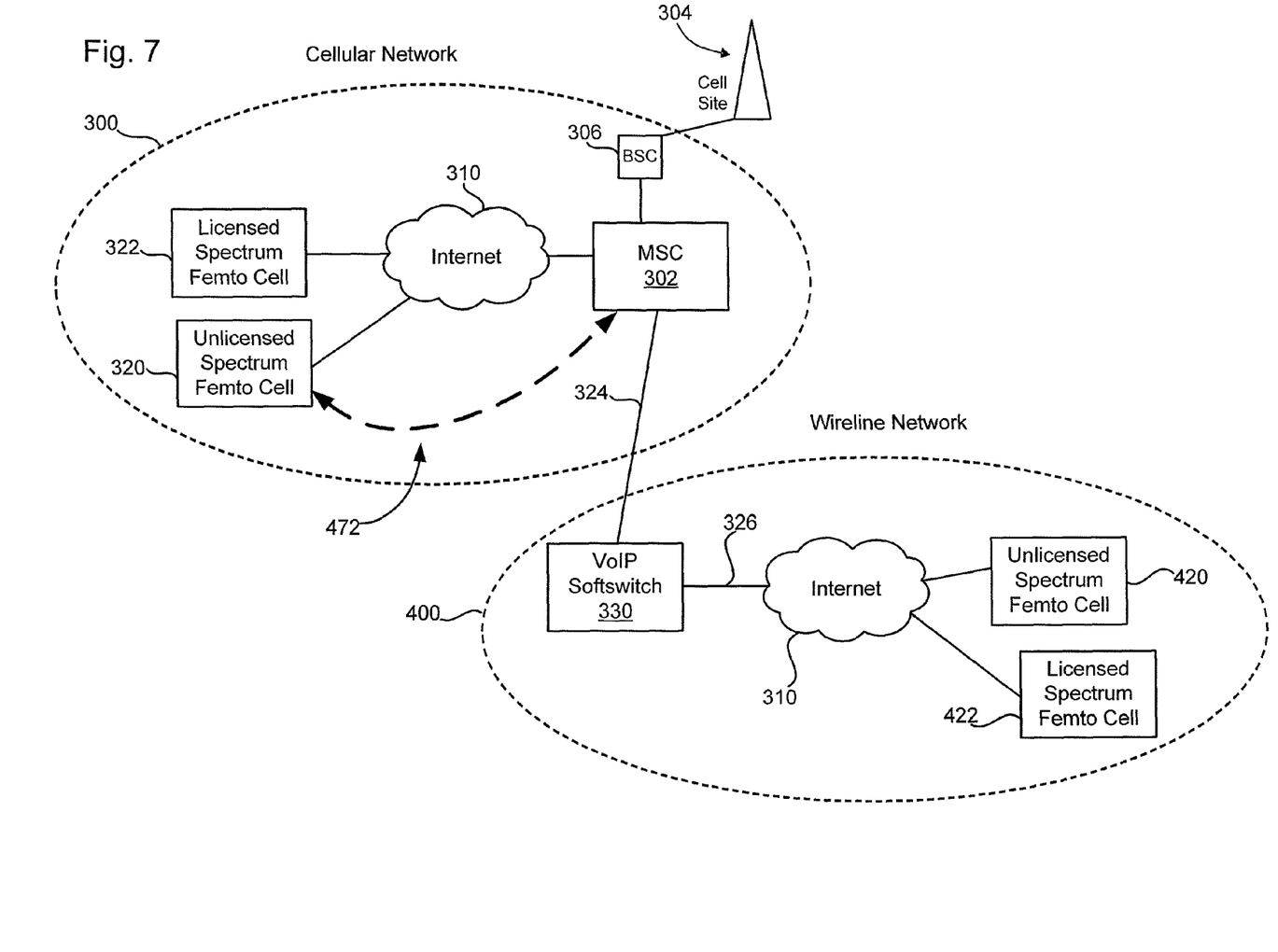

FIG. 7 illustrates another alternate implementation of a cellular network 300 and a wireline network 400 interacting with each other. A number of the components illustrated in FIG. 7 provide functionalities similar to the functionality of components in FIG. 5 having similar names and reference numbers. Therefore, description is provided herein only for those components that are different or if they provide a different functionality. In the implementation disclosed in FIG. 7, the unlicensed spectrum femto cell 320 is illustrated as wirelessly communicating with the MSC 302, as illustrated by the wireless communication link 472. In this implementation, the unlicensed spectrum femto cell 320 may communicate over the unlicensed frequency band with a network operator's switching platform within the MSC 302, wherein such a platform processes voice or data traffic of the network. For example, in such an implementation, the MSC 302 may be adapted to communicate the voice or data traffic directly to the unlicensed spectrum femto cell 320 over an unlicensed frequency band. Providing the MSC 302 with the capability to communicate with the unlicensed spectrum femto cell 320 over the unlicensed frequency band allows the operator of the MSC 302 to utilize additional bandwidth and thus reduce the traffic on the other communication links used by the MSC 302, such as broadbanding cable 324, thus improving efficiency and quality of service provided by the MSC 302.

Figure 8:
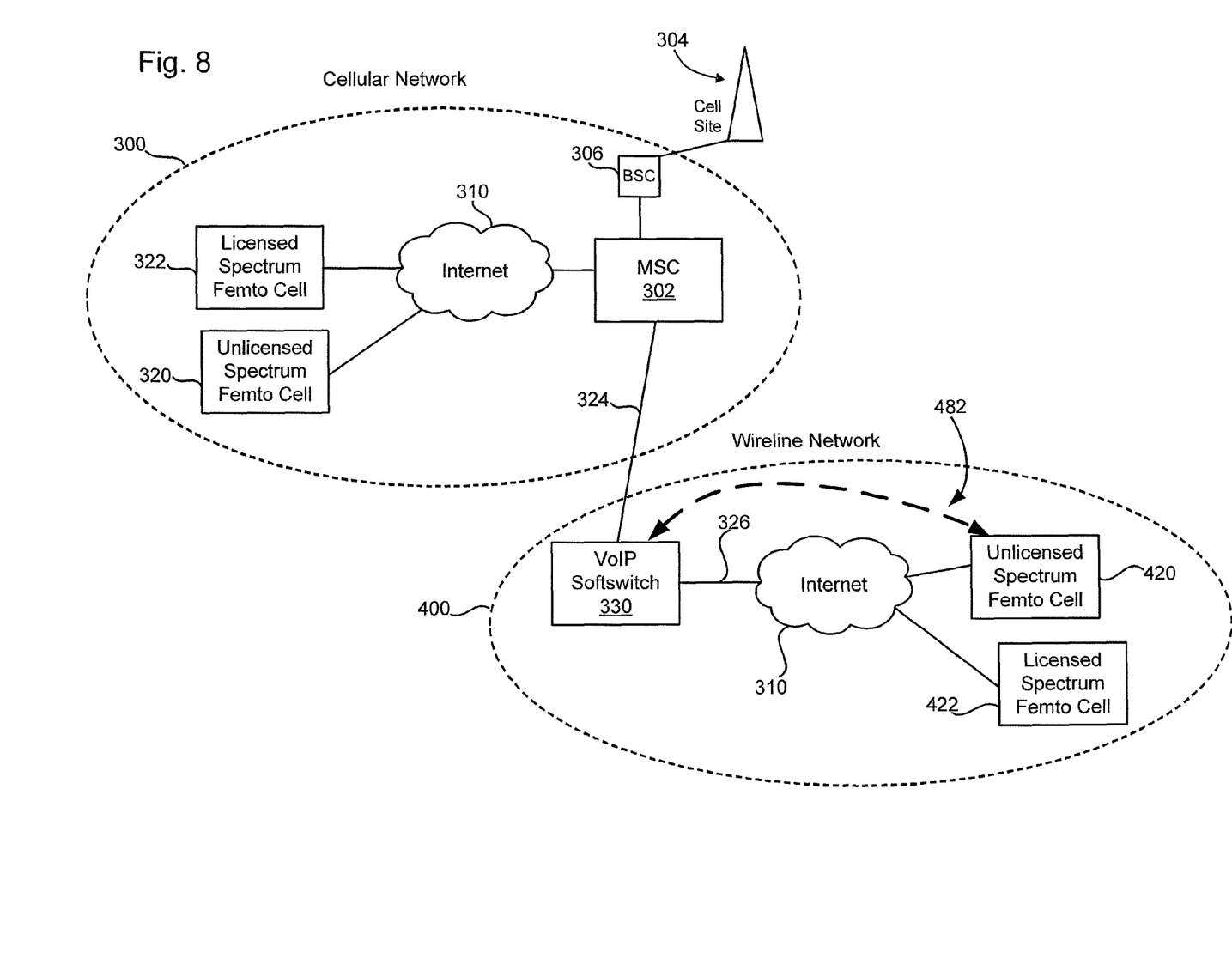

FIG. 8 illustrates yet another alternate implementation of a cellular network 300 and a wireline network 400 interacting with each other. A number of the components illustrated in FIG. 8 provide functionalities similar to the functionality of components in FIG. 5 having similar names and reference numbers. Therefore, description is provided herein only for those components that are different or if they provide a different functionality. In the implementation disclosed in FIG. 8, the unlicensed spectrum femto cell 420 is illustrated as wirelessly communicating with the VoIP softswitch 330, as illustrated by the wireless communication link 482. In this implementation, the unlicensed spectrum femto cell 420 may communicate over the unlicensed frequency band with a network operator's switching platform within the VoIP softswitch 330 wherein such a platform processes voice or data traffic of the network. For example, in such an implementation, the VoIP softswitch 330 may be adapted to communicate the voice or data traffic directly to the unlicensed spectrum femto cell 320 over an unlicensed frequency band. Providing the VoIP softswitch 330 with the capability to communicate with the unlicensed spectrum femto cell 420 over the unlicensed frequency band allows the operator of the VoIP softswitch 330 to utilize additional bandwidth and thus reduce the traffic on the other communications links used by the VoIP softswitch 330, such as broadband cable 326, thus improving efficiency and quality of service provided by the VoIP softswitch 330.

While FIGS. 5 through 8 illustrate the various communication links 452, 462, 472 and 482 to unlicensed spectrum femto cells as communicating with various individual components of the wireless and wireline networks, various combinations of such communication links 452, 462, 472 and 482 may be provided for simultaneous use. For example, in one embodiment, the unlicensed spectrum femto cell 420 may be communicating both with the VoIP switch 330 and with the MSC 302.

A method of communicating using one of the apparatuses and systems disclosed herein will now be described with reference to FIG. 9, in conjunction with FIGS. 4 and 6. Specifically, the flowchart 500 illustrates a method of the dual spectrum device 460 (FIG. 6) communicating with the unlicensed spectrum femto cell 420. The dual spectrum device 460 may be similar to the mobile device 200 illustrated in FIG. 4. At block 502, the dual spectrum device 460 may be communicating with the MSC 302 (FIG. 6) via the cell site 304 over the licensed spectrum of a mobile service provider. For example, the dual spectrum device 460 may be communicating with a wireless phone 464 communicating with the cellular network 300, as shown in FIG. 6. At this point, the incoming signal from the antenna 202 may be directed to the second mixer 214 and the outgoing signal from the core processing module 208 may be directed to the second modulator 216 (FIG. 4).

Subsequently, at block 504, the dual spectrum device 460 may detect the presence of an unlicensed spectrum femto cell 420 via one of the proximity detector 222 or the femto cell detector 220. As a result, at block 506, the dual spectrum device 460 may send a signal to the unlicensed spectrum femto cell 420 and register its e presence with cell 420. In response, at block 508 the unlicensed femto cell 420 may send a request via the VoIP switch 330 to the MSC 302 to set up an alternate connection between the cell phone 464 and the dual spectrum device 460. Once such an alternate communication route is set up, at block 510 the unlicensed femto cell 420 may send a confirmation to the dual mode device 460 about the set up of the alternate communication route with the cell phone 464.

In response to the signal regarding set up of the alternate communication route, at block 512, the ganged control module 230 may start the call transfer process, in order to hand off the call from the cellular network (using licensed spectrum) to the wireless network (using unlicensed spectrum). Specifically, the ganged control module 230 may route the incoming signal from the antenna 202 through the first mixer 212 and routing the outgoing signal from the core processing module 208 through the first modulator 216. Subsequently at block 514, the dual mode device 460 may send a signal to the MSC 302 to disconnect the connection over the licensed frequency spectrum. As a result, at block 514, the dual spectrum device 460 will be communicating with the same wireless phone 464 through the unlicensed spectrum femto cell 420 via the wireline network 400.

Figure 9:
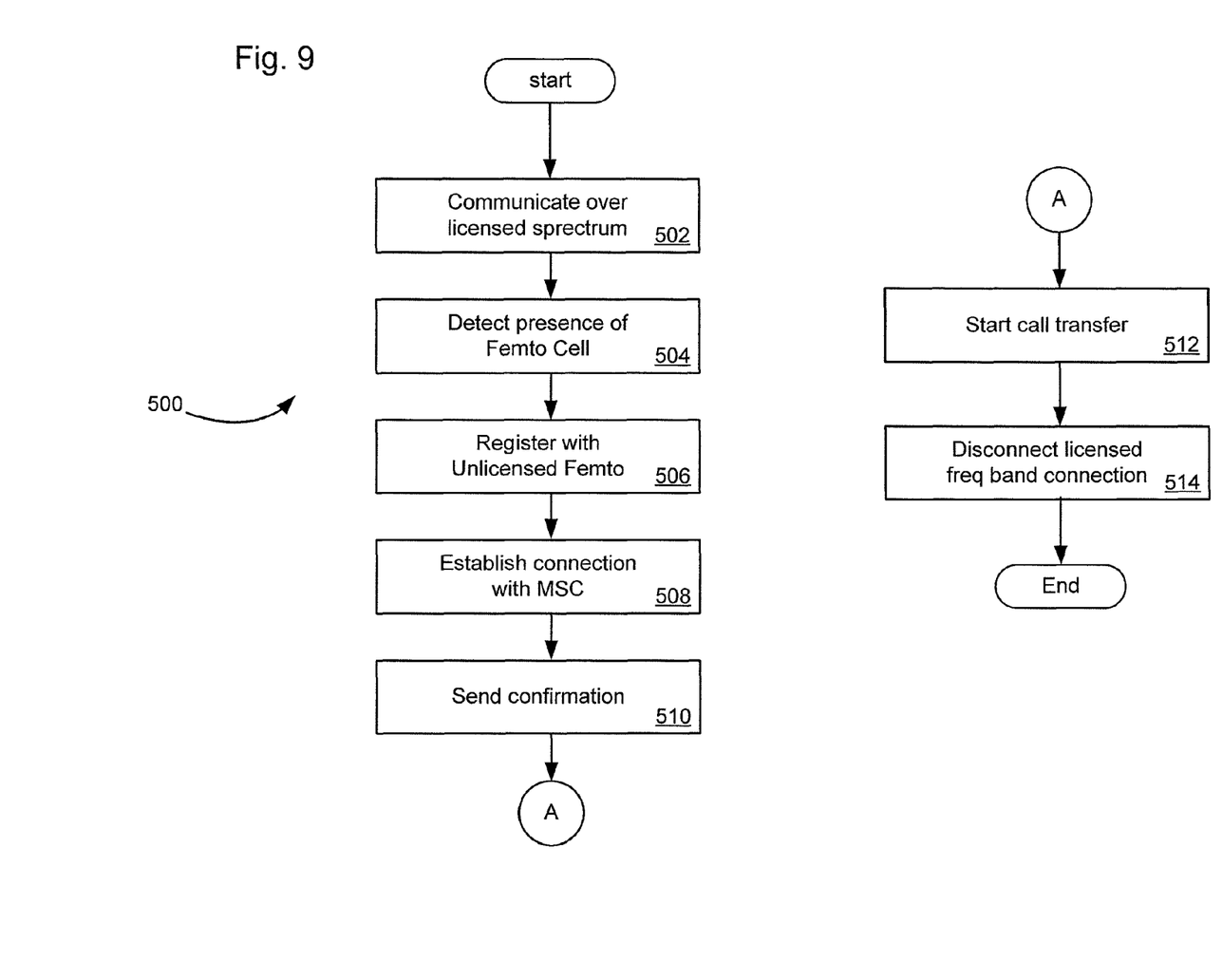
FIG. 9 illustrates a method of using the systems disclosed herein.

While the method described in FIG. 9 illustrates hand-off of call on the dual mode mobile device 460 from a licensed frequency spectrum connection to an unlicensed frequency spectrum connection, similar transfer from a connection over an unlicensed frequency spectrum to a connection over a licensed frequency spectrum may also be implemented. For example, the proximity detector 222 and the femto cell detector 220 may also be adapted to detect the dual mode device 460 leaving a region with access to an unlicensed spectrum femto cell and in response to such detection, the dual mode device 460 may initiate a process to hand-over the call to a connection over a licensed frequency spectrum. Several methods of hand-off of a call on a mobile device between a cellular network and an alternate network are described in further detail in patent application Ser. No. 11/490,515 filed on Jul. 19, 2006 and entitled "Hand-set Registration on a Dual-Mode Environment," which is incorporated herein in its entirety.

Moreover, while the method of FIG. 9 is implemented with respect to the system illustrated in FIG. 6, such a method may also be established for other systems illustrated in FIGS. 5, 7 and 8, as necessary. For example, with respect to FIG. 5, given that the unlicensed spectrum mobile device 450 is operable only over an unlicensed frequency band, a femto cell detection module (similar to cell detector 220, FIG. 4) within unlicensed spectrum mobile device 450 may merely be responsible for initiating a connection over the unlicensed frequency band with the unlicensed spectrum femto cell 420, and thus communications only are possible when a cell 420 or other unlicensed spectrum femto cell is detected.

Similarly, with respect to the system disclosed in FIG. 7, the MSC 302 may determine the presence of the unlicensed spectrum femto cell 320 and establish the communication link 472 with the unlicensed spectrum femto cell 320 to route some of its wireless traffic, when an unlicensed spectrum femto cell is detected. Similarly, with respect to the system disclosed in FIG. 8, the VoIP softswitch 310 may determine the presence of the unlicensed spectrum femto cell 420 and establish the communication link 482 to route some of the wireless traffic when cell 420 or some other unlicensed spectrum femto cell is detected.

While not illustrated in the drawings, it should be appreciated that the operator of a wireline network, or the entity that provides a femto cell or that provides access from a femto cell to the Internet, could meter and bill for resources consumed (e.g., bandwidth connections within a wireline network or bandwidth connections to the Internet).

It will be apparent to those skilled in the art that substantial variations may be made in accordance with specific requirements to all of the systems, methods, software, and other embodiments described above. For example, customized hardware might also be used, and/or particular elements of the dual mode mobile device 200 may be implemented in hardware, software (including portable software, such as applets, etc.), or both. Further, connection to other computing devices such as network input/output devices may be employed.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added, and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system for providing wireless communication, the system comprising:
   a dual mode mobile device that is adapted to communicate over at least one unlicensed frequency band and at least one licensed frequency band; and
   a femto cell communicating over the unlicensed frequency band;
   wherein the dual mode mobile device comprises a femto cell detection module that detects the presence of the femto cell by detecting proximity of the femto cell using a global positioning system, and the dual mode mobile device:
      communicates with the femto cell over the unlicensed frequency band;
      sends a request to the femto cell to establish a direct connection with a mobile switching center (MSC) over the unlicensed frequency band, in response to detection of the femto cell; and
      receives a confirmation from the femto cell that the femto cell has established a direct connection with the MSC over the unlicensed frequency band.

2. The system of claim 1, wherein the dual mode mobile device comprises a femto cell detection module adapted to determine the presence of the femto cell, and wherein the dual mode mobile device communicates with the femto cell in response to determining the presence of the femto cell.

3. The system of claim 2, wherein the unlicensed frequency band is at least one of (1) a direct television white space frequency band; (2) an industrial, scientific and medical (ISM) radio band; and (3) a 3.65 GHz band.

4. The system of claim 1, wherein the dual-mode mobile device further comprises:
 an antenna module adapted to communicate at the unlicensed frequency band and at the licensed frequency band;
 a core processing module to generate an outgoing signal;
 a first mixer module adapted to process the incoming signal from the antenna module at the unlicensed frequency band;
 a second mixer module adapted to process the incoming signal from the antenna module at the licensed frequency band;
 a first modulator to modulate the outgoing signal over an unlicensed frequency band;
 a second modulator to modulate the outgoing signal over a licensed frequency band; and
 a ganged control apparatus adapted to receive a signal from the femto cell detection module and in response to the signal (1) route the incoming signal from the antenna module to the first mixer module, and (2) route the outgoing signal from the core processing module to the first modulator.

5. The system of claim 4, wherein the femto cell detection module is further adapted to detect the presence of the unlicensed femto cell by detecting presence of one or more signals over the unlicensed spectrum.

6. The system of claim 1, wherein the unlicensed spectrum femto cell is communicatively connected to the Internet via a broadband access node.

7. The system of claim 6, wherein the broadband access node is at least one of a DSL access node and a cable access node.

8. The system of claim 1, wherein the unlicensed spectrum femto cell is communicatively connected to the MSC via a voice over IP (VoIP) softswitch.

9. A system for providing wireless communication services, the system comprising:
 a femto cell communicating over the unlicensed frequency band; and
 a mobile switching center (MSC) adapted to communicate over an unlicensed frequency band and over a licensed frequency band;
 wherein the MSC is adapted to communicate with the femto cell over the unlicensed frequency band, and the femto cell:
  communicates with a dual mode mobile device over the unlicensed frequency band, the dual mode mobile device comprising a femto cell detection module that detects the presences of the femto cell by detecting proximity of the femto cell using a global positioning system;
  receives a request from the dual mode mobile device to establish a direct connection with the MSC over the unlicensed frequency band;
  receives a confirmation from the MSC about establishment of a direct connection between the MSC and the femto cell over the unlicensed frequency band; and
  communicates the confirmation to the dual mode mobile device.

10. The system of claim 9, wherein the MSC is adapted to route at least some outgoing wireless traffic from the MSC over the unlicensed frequency band.

11. A system for providing wireless communication services, the system comprising:
 a femto cell communicating over the unlicensed frequency band; and
 a voice over IP (VoIP) switch adapted to communicate over an unlicensed frequency band and over a licensed frequency band;
 wherein the VoIP switch is adapted to communicate with the femto cell over the unlicensed frequency band, the femto cell:
  communicates with a dual mode mobile device over the unlicensed frequency band, the dual mode mobile device comprising a femto cell detection module that detects the presences of the femto cell by detecting proximity of the femto cell using a global positioning system;
  receives a request from the dual mode mobile device to establish a direct connection with the VoIP switch over the unlicensed frequency band;
  receives a confirmation from the VoIP switch about establishment of a direct connection between the VoIP switch and the femto cell over the unlicensed frequency band; and
  communicates the confirmation to the mobile device.

12. The system of claim 11, wherein the VoIP switch is adapted to route at least some outgoing wireless traffic from the VoIP switch over the unlicensed frequency band.

13. A dual mode wireless device, comprising:
 an antenna module adapted to receive an incoming signal, the incoming signal being either at an unlicensed frequency band or at a licensed frequency band;
 a core processing module to generate an outgoing signal;
 a first mixer module adapted to process the incoming signal from the antenna module at the unlicensed frequency band;
 a second mixer module adapted to process the incoming signal from the antenna module at the licensed frequency band;
 a first modulator to modulate the outgoing signal over an unlicensed frequency band;
 a second modulator to modulate the outgoing signal over a licensed frequency band;
 a femto cell detection module that detects the presence of an unlicensed spectrum femto cell by detecting proximity of the femto cell using a global positioning system, and
 a ganged control apparatus adapted to receive a signal from the femto cell detection module and in response to the signal (1) route the incoming signal from the antenna module to the first mixer module, and (2) route the outgoing signal from the core processing module to the first Modulator;
 wherein the dual mode wireless device:
  communicates with the femto cell over the unlicensed frequency band;
  sends a request to the femto cell to establish a direct connection with a mobile switching center (MSC) over the unlicensed frequency band in response to detection of the femto cell; and
  receives a confirmation from the femto cell that the femto cell has established a direct connection with the over the unlicensed frequency band.

14. The dual-mode wireless device of claim 13, further adapted to transmit a request to establish a connection with the unlicensed spectrum femto cell upon the detection of the presence of the unlicensed spectrum femto cell.

15. The dual-mode wireless device of claim 14, further adapted to receive a confirmation signal from the unlicensed spectrum femto cell and in response to the confirmation terminate the connection over the licensed frequency spectrum.

16. A method of communicating between a dual-mode mobile device and a wireless device, the method comprising:
providing the dual-mode mobile device, comprising:
an antenna module adapted to communicate at an unlicensed frequency band and at a licensed frequency band,
a core processing module to generate an outgoing signal,
a first mixer module adapted to process the incoming signal from the antenna module at the unlicensed frequency band,
a second mixer module adapted to process the incoming signal from the antenna module at the licensed frequency band,
a first modulator to modulate the outgoing signal over an unlicensed frequency band,
a second modulator to modulate the outgoing signal over a licensed frequency band,
a femto cell detection module adapted to detect the presence of an unlicensed spectrum femto cell, and
a ganged control apparatus adapted to receive a signal from the femto cell detection module and in response to the signal (1) route the incoming signal from the antenna module to the first mixer module, and (2) route the outgoing signal from the core processing module to the first modulator; and
detecting a presence of the unlicensed spectrum femto cell at the femto cell detection module by detecting proximity of the femto cell using a global positioning system;
transmitting a request to establish a connection with the unlicensed spectrum femto cell upon the detection of the presence of the unlicensed spectrum femto cell;
transmitting a request to the femto cell to establish a direct connection with a switch over the unlicensed frequency band in response to detection of the femto cell; and
receiving a confirmation from the femto cell that the femto cell has established a direct connection with the over the unlicensed frequency band; and
in response to the confirmation, terminating the connection over the licensed frequency spectrum.

17. The method of claim 16, wherein detecting the presence of the unlicensed spectrum femto cell further comprises detecting presence of the signal strength of a signal from the unlicensed spectrum femto cell above a threshold level.

* * * * *